Inventor:
Gerhard Krause
by
Attorney

Inventor:
Gerhard Krause
by
Attorney

United States Patent Office 3,305,627

Patented Feb. 21, 1967

3,305,627

APPARATUS FOR INCREASING THE SIGNAL-TO-NOISE RATIO IN A COMPOUND SIGNAL

Gerhard Krause, Darmstadt, Germany, assignor to Fernseh G.m.b.H., Darmstadt, Germany Filed Sept. 17, 1964, Ser. No. 397,126

Claims priority, application Germany, Sept. 17, 1963, F 40,775

9 Claims. (Cl. 178—5.2)

The invention relates to apparatus for increasing the signal-to-noise ratio in electrical signal transmission systems in which additional informaton is transmtted upon a modulated sub-carrier which, together with its sidebands, falls within the frequency range of a main signal. The invention is especially applicable to apparatus for the transmission of color television signals in which chrominance information is transmitted modulated upon a sub-carrier which, together with its sidebands, falls within the frequency band of a luminance signal.

In previously proposed apparatus for increasing the signal-to-noise ratio in a transmission system for electrical signals, and in particular television signals, whch is described and claimed in copending patent application Serial No. 371,006 a signal si divided into a lower-frequency component and at least one higher-frequncy component and it is arranged that the transmission factor for those signals within said higher-frequency component of which the amplitude is less than a predetermined threshold level, substantially corresponding with the noise level in the transmission link, is less than that for signals of which the amplitude exceeds this threshold level. The two components, the original lower-frequency component and the modified higher-frequency component are then recombined into one signal of improved signal-to-noise ratio.

In a modifications of this apparatus, which may be used to increase the signnal-to-noise ratio in signals upon which interference becomes superimposed during transmission over a signal transmission link, those signal components of higher frequency and small amplitude, which are suppressed or attenuated at the end of the transmission link, are preemphasised by amplitude-dependent amplification at the beginning of the transmission link.

In the transmission of color television signals the signal-to-noise ratio may thus be improved by employing such apparatus at the output of a transmission link, or at the input and at the output of a transmission link, for each of the primary color television signals corresponding to the picture to be transmitted. In this case suitable apparatus must be provided in each of the three primary color transmission channels, which involves three times the cost as compared with the use of such apparatus in a single channel only, as for black and white television.

As is well known in the television art, the transmission of chrominance information in a color television system is effected within the frequency band provided for black and white television by using a luminance signal of the full bandwidth and transmitting the chrominance information in the form of a modulated sub-carrier of restricted bandwidth within the same signal band. In order to make use of the apparatus described in copending patent application Serial No. 371,006 mentioned above to increase the signal-to-noise ratio of the signal, it would therefore be necessary in addition to recover the television signals corresponding with the three primary colors by decoding.

As a rule, the coding of the color television signal is effected immediately at the individual signal sources, that is, at the color television cameras, or color film scanners.

When pre-emphasis apparatus is to be made use of at the input to the transmisson link, it therefore becomes necessary to provide three pre-emphasis devices at each color scanner, which would necessitate a further considerable increase in cost.

It is an object of the invention to provide apparatus for increasing the signal-to-noise ratio in a compound signal of which a first component is transmitted within a predetermined frequency band and a second component is transmitted over the same transmission link as a modulation of a sub-carrier which, together with its modulation sidebands, falls within said predetermined frequency band.

Another object of the invention is the provision of an apparatus for increasing the signal-to-noise ratio in a color television signal consisting of a luminance signal and a chrominance information in the form of a modulated sub-carrier within the same signal band.

These and other objects of the invention are achieved in an apparatus comprising means for separating said first component into lower and higher frequency portions, means for separating said sidebands of said sub-carrier into lower and higher frequency portions, means for transmitting both said lower frequency portions unmodified over said transmission link, and means operating on said higher-frequency portions of both said first and said second component to produce a relative reduction in the transmission factor of those signals of which the amplitudes are less than a predetermined level, and means for recombining said lower and higher frequency portions into a signal of increased signal-to-noise ratio. Preferably the predetermined amplitude is that corresponding with the noise level in said transmission link.

When use is made of apparatus according to the present invention it is no longer necessary to separate the coded color television signal into the component signals corresponding with the primary colors. Instead, a single apparatus may be employed at the end of the transmission link, or a first apparatus at the beginning of the link and a second at its end, as will be further described below, effecting respectively pre-emphasis and de-emphasis of the transmitted signal.

Apparatus according to the invention may be employed with advantage to reduce the effects of interference upon color television signals which are transmitted by radio or over line for long distances, or where the color television signal is recorded, for example, by the use of magnetic recording, and is later reproduced.

The novel features that are considered characteristic of the invention are set forth with particularly in the appended claims. The invention itself, both as to its organization and method of operation, as well as additional objects and advantages thereof, will best be understood from the following description when read in connection with the accompanying drawing. The drawing comprises FIGS. 1 to 6, in which like numerals are used to represent elements having like functions, and in which:

Figure 1:
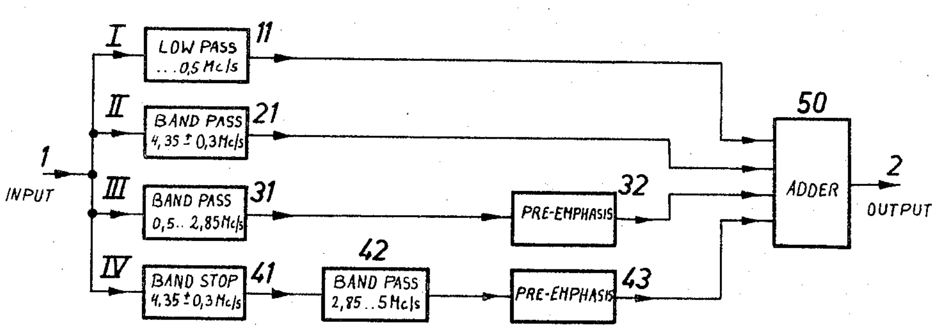
FIG. 1 shows schematically apparatus for use at the beginning of a transmission link, in which an incoming signal is divided among four parallel paths in order to effect preemphasis of certain portions in accordance with the invention.

In the apparatus represented in FIG. 1, a signal received at 1 is assumed to be a color television signal to the prospective European standard. Such a signal comprises a luminance signal having a frequency range of 0 to 5 mc./s. upon which is superimposed a color sub-carrier having a frequency of 4.35 mc./s. and modulated by chrominance signals having frequencies up to 1.5 mc./s. This signal is divided among four parallel channels I, II, III and IV and, after transversing these parallel channels is recombined into a complete color television signal in an adding stage 50, whence the signal is fed out at 2.

Channel I contains a low-pass filter 11 arranged to pass only the lower-frequency components of the luminance signal, for example the band from 0 to 0.5 mc./s. Channel II includes a band-pass filter 21, which is arranged to pass only the color sub-carrier and the associated lower-frequency sidebands. The pass band of this band-pass filter may be, for example, 4.35±0.3 mc./s. In channel III there is provided a band-pass filter 31, of which the lower cut-off frequency coincides with the upper cut-off frequency of the low-pass filter 11 in channel I, while its upper cut-off frequency corresponds with the highest modulation frequency of the lower sideband of the color sub-carrier, that is to 2.85 mc./s. Following band-pass filter 31 is a pre-emphasis amplifier 32 which produces a relative increase in the transmission factor for the lower signal amplitudes. This amplifier is caused to increase the gain for those signals of amplitudes up to that corresponding to the noise level in the transmission link. Channel IV includes firstly a band-stop filter 41, the stop band of which corresponds to the pass band of filter 21 in channel II, that is, it strongly attenuates frequencies of 4.35±0.3 mc./s. After band-stop filter 41 there follows a band-pass filter 42 which passes the full range of sidebands of the color sub-carrier which, owing to the upper limit imposed by the 5 mc./s. cut-off of the luminance channel, extend from 2.85 mc./s. to 5 mc./s.

$$\left(=4.35\text{ mc./s.}\begin{array}{l}+0.65\text{ mc./s.}\\-1.50\text{ mc./s.}\end{array}\right)$$

Band-pass filter 42 is followed by a second pre-emphasis amplifier 43, which produces a relative increase in the gain of those signal components in this channel which have amplitudes up to that corresponding to the noise level in the transmission link.

Figure 2:
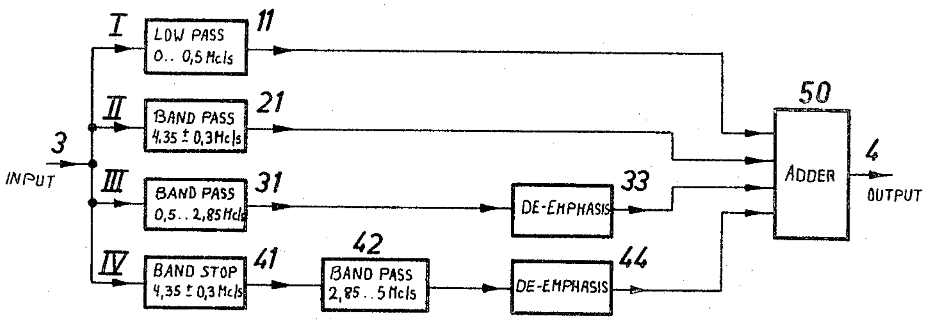
FIG. 2 represents the corresponding arrangements for use at the end of the transmission link.

FIG. 2 shows arrangements which may be made use of at the end of a transmission link to increase the signal-to-noise ratio in accordance with the present invention. The incoming signal, assumed to the color television signal, which may have been subjected to pre-emphasis by an arrangement such as that described above in relation to FIG. 1, or may be applied to the link as an unmodified signal, is again divided among four channels of which the frequency responses correspond with those of the four channels of FIG. 1. To effect this distribution there may be employed an arrangement of filters identical with that described in relation to FIG. 1. The corresponding filters are therefore denoted by the same reference numerals as in FIG. 1 and will not be further described. In place of the pre-emphasis amplifiers 32 and 43 used respectively in channels III and IV of the apparatus described in relation to FIG. 1, however, there are provided in channels III and IV respectively de-emphasis devices 33 and 44. These devices have characteristics such that the signals applied to them which have amplitudes less than a predetermined threshold level, corresponding substantially with the noise level in the transmission link, are subjected to relative attenuation. An increase of the signal-to-noise ratio in the signal is thus obtained.

Where apparatus of the kind described in relation to FIG. 1 is used at the beginning of the transmission link, de-emphasis devices 33 and 44 will be given characteristics which are the inverse of the characteristics of pre-emphasis amplifiers 32 and 43, so that the effect of the pre-emphasis is counteracted and the original signal is reproduced with improved signal-to-noise ratio.

Figure 3:
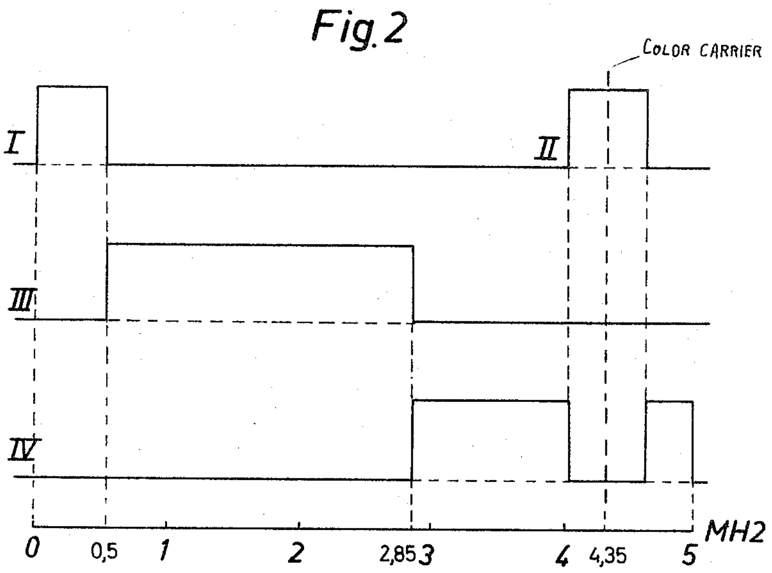
FIG. 3 shows diagrammatic frequency spectra, illustrating the distribution among the four channels of the frequency components comprising a color television signal of the prospective European standard.

The schematic frequency spectra shown in FIG. 3 illustrate the frequency bands passed by channels I to IV in the apparatus described above in relation to FIGS. 1 and 2. As shown at the left-hand end of the upper frequency spectrum, channel I passes only low-frequency signal components up to a frequency of 0.5 mc./s. Channel II, the response of which is shown at the right-hand end of the uppermost spectrum, passes only signals lying within a relatively narrow band centered about the frequency, represented by a broken vertical line, of the color sub-carrier. As already stated, this sub-carrier has a frequency of 4.35 mc./s. and the filter in channel II is arranged to pass frequencies lying within ±0.3 mc./s. of this carrier frequency, that is, the lower-frequency sidebands only of the carrier. Channel III, as shown by the center spectrum, passes signals having frequencies within the range from the cut-off frequency of channel I (0.5 mc./s.) to the lowest sideband frequency of the modulated sub-carrier (2.85 mc./s.). And finally, channel IV passes all frequencies from 2.85 to 5 mc./s., with the exception of the band from 4.05 to 4.65 mc./s. passed by channel II.

Figures 4, 6:
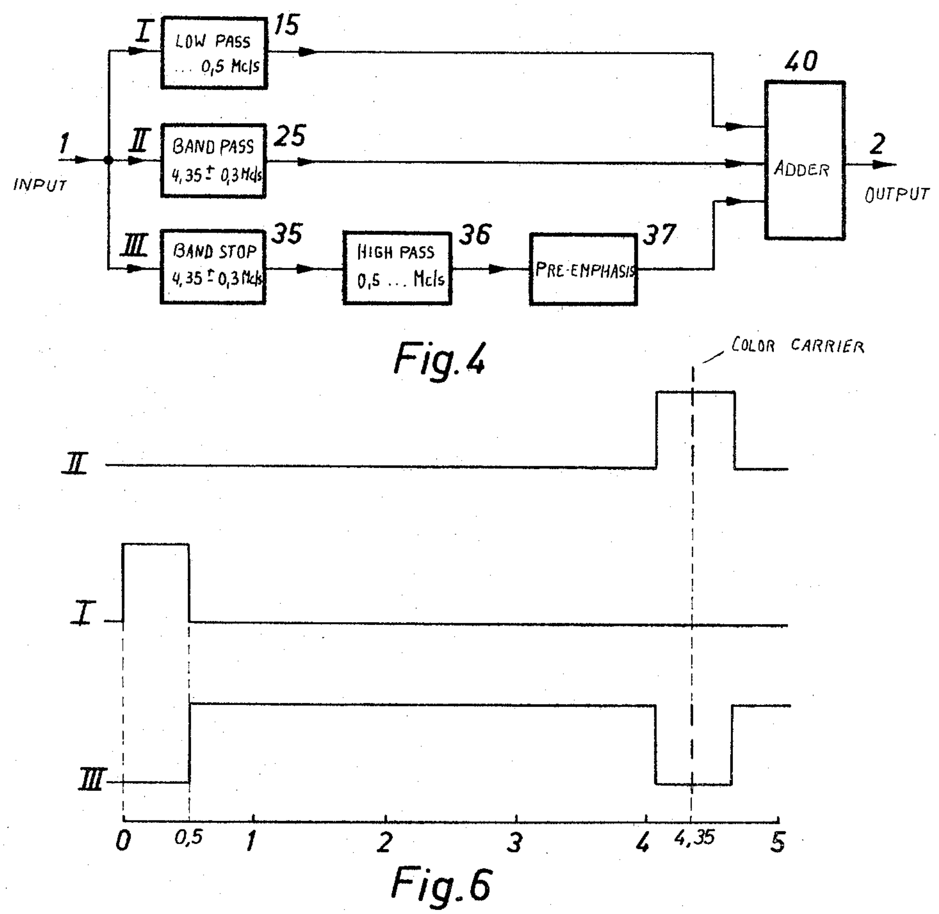
FIG. 4 shows an alternative arrangement in which the color television signals are divided among three separate paths at the beginning of a transmission link.
FIG. 6 illustrates the distribution of the frequency components of a color television signal according to the prospective European standard among the three channels of the apparatus described in relation to FIGS. 4 and 5.

FIG. 4 represents an alternative embodiment of apparatus which may be provided at the beginning of a transmission link in accordance with the present invention. Here again the signal being transmitted is assumed to be a color television signal in accordance with the prospective European standard, as already described. This signal, which is received at 1, is applied to three parallel channels I, II and III, of which only channel III contains a pre-emphasis amplifier. As in the apparatus described above in relation to FIG. 1, channel I contains a low-pass filter 15, which passes only the lower-frequency video components (0–0.5 mc./s.) of the color television signal. Again as in FIG. 1, channel II contains a band-pass filter 25 which passes the color sub-carrier and its lower-frequency sidebands (4.35 mc./s. ±0.3 mc./s.). In this embodiment, however, channel III contains firstly a band-stop filter 35 operating similarly to the filter 41 of FIG. 1, in that it suppresses the color sub-carrier and its lower-frequency sidebands which are passed by channel II, that is the band of 4.35±0.3 mc./s. In this case, however, band-stop filter 35 is followed by a high-pass filter 36 which has its cut-off frequencyat 0.5 mc./s., corresponding with the cut-off frequency of low-pass filter 15 in channel I, and passes all higher frequencies within the signal frequency band. After this high-pass filter 36 there is provided a pre-emphasis amplifier 37 which increases the gain of the lower signal amplitudes in the signal applied to it, the boost being effective up to signal amplitudes corresponding substantially to the noise level. As in FIG. 1, the signal components passed by the various channels are recombined in an adding stage 40 and are made available at an output 2.

Figure 5:
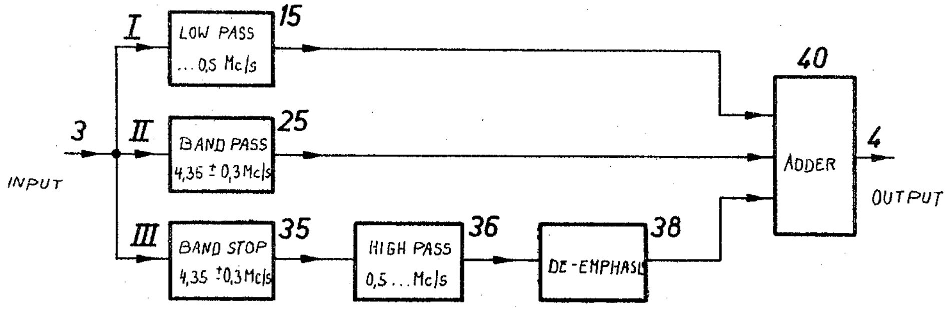
FIG. 5 shows the arrangements, corresponding with those of FIG. 4, for use at the end of the transmission link.

FIG. 5 shows corresponding arrangements for use at the end of a transmission link in order to carry out the invention. The division of the signal frequency band between the three channels I, II and III is effected by filters 15, 25, 35 and 36 having the same characteristics as the similarly numbered filters described above in relation to FIG. 4. Specifically, filter 15 is a low-pass filter having a cut-off frequency of 0.5 mc./s., filter 25 is a band-pass filter passing the sub-carrier and its lower-frequency sidebands (4.35±0.3 mc./s.), filter 35 is a band-stop filter (4.35±0.3 mc./s.) and filter 36 is a high-pass filter having its cut-off frequency at 0.5 mc./s. In place of the pre-emphasis amplifier 37 included in channel II in the apparatus described in relation to FIG. 1, however, in the apparatus shown in FIG. 5 the filter 36 is followed by a de-emphasis device 38 having a response which is the inverse of that of pre-emphasis amplifier 37. The signal components from channels I, II and III are again fed into an adding stage 40 in which they are recombined into a complete color television signal of improved signal-to-noise ratio, which is fed out at 4.

It may in some cases be found desirable to modify the apparatus described above in relation to FIGS. 1, 2, 4 and 5 by placing additional filters following the pre-emphasis amplifiers 23, 43 and 37, and after the de-emphasis devices 33, 44 and 38, these filters having characteristics similar to those of the filters included in front of the amplifiers or devices, in order to reduce cross-talk between the channels, especially from the color sub-carrier channel.

The frequency spectra shown in FIG. 6 represent schematically the frequency bands passed by the three channels in the apparatus described in relation to FIGS. 4 and 5. Specifically, the uppermost spectrum illustrates the bandpass characteristic of filter 25 in channel II, the central diagram illustrates the low-pass characteristic of low-pass filter 15 in channel I, and the lowest diagram illustrates the combined characteristics of the band-stop filter 35 and high-pass filter 36 of channel III. As in FIG. 3, the sub-carrier frequency is indicated by broken vertical lines.

It is also possible to replace the series combination of band-stop filter with another filter, used in channel IV of FIGS. 1 and 2 and in channel III of FIGS. 4 and 5, by single filter networks having characteristics corresponding to those of the series combination which they replace. In the embodiments of FIGS. 1 and 2 it is possible to make use of a high-pass filter in place of the band-pass filter 36 in channel IV, since the upper limit of the frequency band occupied by the signal is limited elsewhere in the signal channel at a frequency which, for the European television standard is 5 mc./s. Similarly, the high-pass filter 36 of the embodiment described in detail in relation to FIGS. 4 and 5 may be replaced by a band-pass filter.

It is also possible, as described in copending patent application Serial No. 371.006, instead of simply dividing the frequency bands of the luminance and of the chrominance signals each into two separate frequency bands, to effect a division of each initial signal frequency band into more than two separate frequency bands, those bands of higher frequency being differently pre- and de-emphasised.

It will be understood by those skilled in the art that the use of the invention is not restricted to improving the signal-to-noise ratio of color television signals to the prospective European standard, in which application it has been specifically described, but that the invention may also be employed to increase the signal-to-noise ratio of color television signals to other standards, for example the standard established in U.S.A., or in other signals in which a first signal component of predetermined frequency range is accompanied by a further component consisting of a modulated sub-carrier, which together with its sidebands, lies within that predetermined range. The modifications of the apparatus described to deal with a case in which more than one sub-carrier is transmitted within the frequency range of the first signal component will also be apparaent to those skilled in the art.

What is claimed and desired to be secured by Letters Patent is:

1. Apparatus for increasing the signal-to-noise ratio in a compound signal of which a first component is transmitted within a predetermined frequency band and a second component is transmitted as a modulation of a sub-carrier which, together with its modulation sidebands, falls within said predetermined frequency band, comprising means for separating said first component into lower and higher frequency portions, means for separating said sidebands of said sub-carrier into lower and higher frequency portions, means for transmitting both said lower frequency portions unmodified, and means operating on said higher-frequency portions of both said first and said second component to produce a relative reduction in the transmission factor of those signals of which the amplitudes are less than a predetermined level corresponding substantially with the noise level in said compound signal, and means for recombining said lower and high frequency portions into a signal of increased signal-to-noise ratio.

2. Apparatus according to claim 1 in which said compound signal includes more than one signal component consisting of a modulated sub-carrier and in which said means for separating said components into higher and lower frequency portions includes means for separating the sidebands of each said sub-carrier into such higher and lower frequency portions.

3. Apparatus according to claim 5 in which said compound signal includes more than one signal component consisting of a modulated sub-carrier and in which said means for separating said components into higher and lower frequency portions includes means for separating the sidebands of each said sub-carrier into such higher and lower frequency portions.

4. Apparatus for increasing the signal-to-noise ratio in a compound signal of which a first component is transmitted within a predetermined frequency band and a second component is transmitted over the same transmission link as a modulation of a sub-carrier which, together with its modulation sidebands, falls within said predetermined frequency band, comprising means for separating said first component into lower and higher frequency portions, means for separating said sidebands of said sub-carrier into lower and higher frequency portions, means for transmitting both said lower frequency portions unmodified, and means operating on said higher-frequency portions of both said first and said second component to produce a relative reduction in the transmission factor of those signals of which the amplitudes are less than a predetermined level corresponding substantially with the noise level in said transmission link, and means for recombining said lower and higher frequency portions into a signal of increased signal-to-noise ratio.

5. Apparatus for increasing the signal-to-noise ratio in a compound signal of which a first component is transmitted within a predetermined frequency band and a second component is transmitted over the same transmission link as a modulation of a sub-carrier which, together with its modulation sidebands, falls within said predetermined frequency band, in which said transmission link is preceded by the combination of means for dividing the signal to be transmitted over said link into lower and higher frequency portions, means for separating said sidebands of said sub-carrier into lower and higher frequency portions, means for transmitting both said lower frequency portions unmodified, and means operating on said higher-frequency portions of both said first and said second component to produce a relative increase in the transmission factor of those signals of which the amplitudes are less than a predetermined level, means for recombining said lower and higher frequency portions into a signal to be transmitted, and means for separating said first component of the transmitted signal into said lower and higher frequency portions, means for separating said sidebands of said sub-carrier into said lower and higher frequency portions, means for transmitting both said lower frequency portions unmodified, and means operating on said higher-frequency portions of both said first and said second component to produce a relative reduction in the transmission factor inverse of the transmission factor of those signals of which the amplitudes are less than said predetermined level, and means for recombining said lower and higher frequency portions into a signal of increased signal-to-noise ratio.

6. Apparatus for increasing the signal-to-noise ratio in a color television signal comprising a first channel including a low-pass filter, a second channel including a first band-pass filter of which the pass band accepts the color carrier of the color television signal and its lower-frequency sidebands, a third channel including the series combination of a second band-pass filter arranged to pass signal frequencies above the cut-off frequency of said low-pass filter and below the lowest sideband frequency of said color carrier and a first-non-linear device producing relative reduction in the transmission factor of those signals of which the amplitudes are less than a predetermined level, and a fourth channel including the series combination of a band-stop filter of which the stop band corresponds with the pass band of said first band-pass filter, a filter arranged to pass all sideband frequencies of said color carrier and a second non-linear device producing a relative reduction in the transmission factor of those signals of which the amplitudes are less than a predetermined level corresponding substantially with the noise level in said color television signal, said color television signal being applied equally to the inputs of said channels, and the outputs of said channels being recombined into a color television signal of increased signal-to-noise ratio.

7. Apparatus for increasing the signal-to-noise ratio in a color television signal transmitted over a transmission link comprising a first channel including a low-pass filter, a second channel including a first band-pass filter of which the pass band accepts the color carrier of the color television signal and its lower-frequency sidebands, a third channel including the series combination of a second band-pass filter arranged to pass signal frequencies above the cut-off frequency of said low-pass filter and below the lowest sideband frequency of said color carrier and a first non-linear device producing a relative increase in the transmission factor of those signals of which the amplitudes are less than a predetermined level, and a fourth channel including the series combination of a band-stop filter of which the stop band corresponds with the pass band of said first band-pass filter, a filter arranged to pass all sideband frequencies of said color carrier and a second non-linear device producing a relative increase in the transmission factor of those signals of which the amplitudes are less than a predetermined level, said color television signal being applied equally to the inputs of said channels, and the outputs of said channels being recombined into a color television signal to be transmitted over said transmission link, means for dividing said signal transmitted over said link into portions like to those into which it is divided before said transmission, comprising a first channel including a low-pass filter, a second channel including a first band-pass filter of which the pass band accepts said color carrier, a third channel including the series combination of a second band-pass filter arranged to pass signal frequencies above the cut-off frequency of said low-pass filter and below the lowest sideband frequency of said color carrier and a third non-linear device producing a relative reduction in the transmission factor of those signals of which the amplitudes are less than a predetermined level correpsonding to the predetermined level of said first non-linear device and a fourth channel including the series combination of a band-stop filter of which the stop band corresponds with the pass band of said first band-pass filter, a filter arranged to pass all sideband frequencies of said color carrier and a fourth non-linear device producing a relative reduction in the transmission factor of those signals of which the amplitudes are less than a predetermined level corresponding to the predetermined level of siad second non-linear device, the transmitted color television signal being applied equally to the inputs of said channels, and the outputs of said channels being recombined into a color televsion signal.

8. Apparatus for increasing the signal-to-noise ratio in a color television signal comprising a first channel including a low-pass filter, a second channel including a band-pass filter of which the pass band accepts the color carrier of the color television signal and its lower-frequency sidebands, and a third channel including the series combination of a band-stop filter of which the stop band corresponds with the pass band of said band-pass filter, a filter arranged to pass all signal frequencies exceeding the cut-off frequency of said low-pass filter, and a non-linear device producing a relative reduction in the transmission factor of those signals of which the amplitudes are less than a predetermined level corresponding substantially with the noise level in said color television signal, said color television signal being applied equally to the inputs of said channels, and the outputs of said channels being recombined into a color television signal of increased signal-to-noise ratio.

9. Apparatus for increasing the signal-to-noise ratio in a color television signal transmitted over a transmission link comprising a first channel including a low-pass filter, a second channel includling a band-pass filter of which the pass band accepts the color carrier of the color television signal and its lower-frequency sidebands, and a third channel including the series combination of a band-stop filter of which the stop band corresponds with the pass band of said band-pass filter, a filter arranged to pass all signal frequencies exceeding the cut-off frequency of said low-pass filter, and a non-linear device producing a relative increase in the transmission factor of those signals of which the amplitudes are less than a predetermined level, said color television signal being applied equally to the inputs of all three said channels and the outputs of said channels being recombined into a color television signal to be transmitted over said transmission link, means for dividing the signal transmitted over said link into portions like to those into which it is divided before said transmission, comprising a first channel including a low-pass filter, a second channel including a band-pass filter of which the pass band accepts said color carrier and its lower-frequency sidebands, and a third channel including the series combination of a band-stop filter of which the stop band corresponds with the pass band of said band-pass filter, a filter arranged to pass all signal frequencies exceeding the cut-off frequency of said low-pass filter, and a non-linear device producing a relative reduction in the transmission factor of those signals of which the amplitudes are less than said predetermined level, the transmitted color television signal being applied equally to the inputs of all three said channels, and the outputs of said channels being recombined into a color television signal.

No references cited.

DAVID G. REDINBAUGH, *Primary Examiner.*

J. A. O'BRIEN, *Assistant Examiner.*